United States Patent
Schreter

(10) Patent No.: US 10,970,175 B2
(45) Date of Patent: Apr. 6, 2021

(54) FLEXIBLE PER-REQUEST DATA DURABILITY IN DATABASES AND OTHER DATA STORES

(71) Applicant: SAP SE, Walldorf (DE)

(72) Inventor: Ivan Schreter, Malsch (DE)

(73) Assignee: SAP SE, Walldorf (DE)

(*) Notice: Subject to any disclaimer, the term of this patent is extended or adjusted under 35 U.S.C. 154(b) by 1132 days.

(21) Appl. No.: 15/183,648

(22) Filed: Jun. 15, 2016

(65) Prior Publication Data

US 2017/0364417 A1    Dec. 21, 2017

(51) Int. Cl.
G06F 11/14     (2006.01)
G06F 16/23     (2019.01)
G06F 3/06      (2006.01)

(52) U.S. Cl.
CPC ........ *G06F 11/1471* (2013.01); *G06F 3/0604* (2013.01); *G06F 3/0656* (2013.01); *G06F 3/0683* (2013.01); *G06F 16/23* (2019.01); *G06F 16/2358* (2019.01); *G06F 16/2379* (2019.01)

(58) Field of Classification Search
CPC .............................. G06F 16/23; G06F 11/1471
See application file for complete search history.

(56) References Cited

U.S. PATENT DOCUMENTS

| 7,653,836 | B1* | 1/2010 | Chatterjee | G06F 11/1076 714/15 |
| 9,092,475 | B2 | 7/2015 | Schreter | |
| 9,183,245 | B2 | 11/2015 | Schreter | |
| 2009/0271412 | A1 | 10/2009 | Lacapra et al. | |
| 2013/0117234 | A1 | 5/2013 | Schreter | |
| 2015/0370575 | A1* | 12/2015 | Tonry | G06F 21/10 713/2 |
| 2016/0344834 | A1* | 11/2016 | Das | H04L 67/2842 |

OTHER PUBLICATIONS

Rangegowda, Dharshan. "Understanding Durability and Write Safety in MongoDB." 2 pages. https://scalegrid.io/blog/understanding-durability-write-safety-in-mongodb/. Aug. 8, 2014.*

* cited by examiner

*Primary Examiner* — Charles E Lu
(74) *Attorney, Agent, or Firm* — Mintz Levin Cohn Ferris Glovsky and Popeo, P.C.

(57) ABSTRACT

An approach for providing flexible durability operations for a data storage application can include requests to perform logging operations of data storage application having an indication of a durability mode to use for the logging operation. The logging operation can be initiated according to the indication of the durability mode and a callback indicating log write completion can be called according to the indication of the durability mode.

18 Claims, 4 Drawing Sheets

```
function log(data, mode, callback):
    if data does not fit into the buffer:
        flush(current buffer)
    end if
    add data to the current buffer
    if mode == immediate:
        add callback to the callback list of the current buffer
        flush(current buffer)
    else if mode == delayed:
        call callback
        flush(current buffer)
    else if mode == relaxed:
        call callback
    else
        error       // unknown mode
    end if
```

100

```
function log(data, mode, callback):
    if data does not fit into the buffer:
        flush(current buffer)
    end if
    add data to the current buffer
    if mode == immediate:
        add callback to the callback list of the current buffer
        flush(current buffer)
    else if mode == delayed:
        call callback
        flush(current buffer)
    else if mode == relaxed:
        call callback
    else
        error       // unknown mode
    end if
```

```
function io_finished(buffer):
    set io_done flag on buffer
    if previous_io_done flag is set on buffer
        process_io_finish(buffer)
```

```
function process_io_finish(buffer):
    for each callback in buffer's callback list:
        call callback
    end for each
    release buffer
    set previous_io_done flag on the successor buffer
    if io_done flag is set on the successor buffer:
        process_io_finish(successor buffer)
    end if
```

```
function timeout:
    flush(current buffer)
```

FLEXIBLE PER-REQUEST DATA DURABILITY IN DATABASES AND OTHER DATA STORES

TECHNICAL FIELD

The subject matter described herein relates to data storage, and in particular to durability options for writing data to a secondary (e.g. persistent) storage.

BACKGROUND

Contemporary databases and other data stores (such as document stores, key/value stores and message queues) usually do not offer flexible durability options. In other words, If more than one durability option is offered, it is only applicable to a whole data store object (e.g. a database table, a message queue, or the like). Some data stores have a default configuration in which no guarantees of durability are offered, but do add the possibility to explicitly flush data and wait (such as for example the object store MongoDB available from MongoDB, Inc. of Palo Alto, Calif.). Such solutions are generally limited and involve a performance cost. Conventional databases (such as, for example the HANA database available from SAP SE of Walldorf, Germany) generally do not make any compromises and store data immediately durably for every transaction.

Delayed and relaxed durability can enable write transactions to continue running as if a transaction log has been flushed to disk immediately. In reality, the writes to disk are generally grouped and deferred, to be handled in the background. Such transactions are optimistic. In other words, the transaction proceed assuming that the log flush will happen. For delayed durability, a log flush is triggered immediately after sending a reply back. In a relaxed durability approach, log writes are grouped and written out when the buffer is full or when a timeout expires (to limit maximum amount of data loss). For example, a system can use a 60 KB chunk of log buffer, and can attempt to flush the log to disk when this 60 KB block is full (at the latest—the flush can and often will happen before that). This option can optionally be set at the database level, at the individual transaction level, or, in the case of natively compiled procedures in In-Memory OLTP, at the procedure level. The database setting wins in the case of a conflict. For example, if the database is set to disable delayed or relaxed writes, trying to commit a transaction using the delayed option will simply be ignored, with no error message. Also, some transactions are always immediately durable, regardless of database settings or commit settings.

SUMMARY

Aspects of the current subject matter can provide the ability to offer flexible durability options for write operations from data buffers to persistent/secondary storage in data stores.

In one aspect, a method includes receiving a request to perform a logging operation of a data storage application. The logging operation includes writing of data to a secondary storage. The request includes an indication of a durability mode to use for the logging operation. The method further includes initiating the logging operation according to the indication of the durability mode and calling a callback indicating log write completion according to the indication of the durability mode. The log write completion indicates a current log buffer containing data was completely written to the secondary storage.

In some variations one or more of the following features can optionally be included in any feasible combination. The initiating can include immediately writing the current log buffer containing data to the secondary storage and adding the callback to a callback list of a current log buffer such that the callback is called as soon as the writing is completed when the indication is for an immediate durability mode. The initiating can include immediately writing the current log buffer containing data to the secondary storage when the indication is for a delayed durability mode, and immediately calling the callback as soon as data are written to a buffer but not yet to the secondary storage. The initiating can include not immediately writing the log buffer containing data to the secondary storage and calling the callback immediately when the indication is for a relaxed durability mode. The method can further include writing the current log buffer at the latest when the current log buffer becomes full or when a timeout occurs. The request can further include an indication of the data to be logged and a type of the callback.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a database application, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1A, FIG. 1B, FIG. 1C, and FIG. 1D shows examples of pseudo-code illustrating features that can be included in implementations of the current subject matter;

When practical, similar reference numbers denote similar structures, features, or elements.

DETAILED DESCRIPTION

Figure 2:
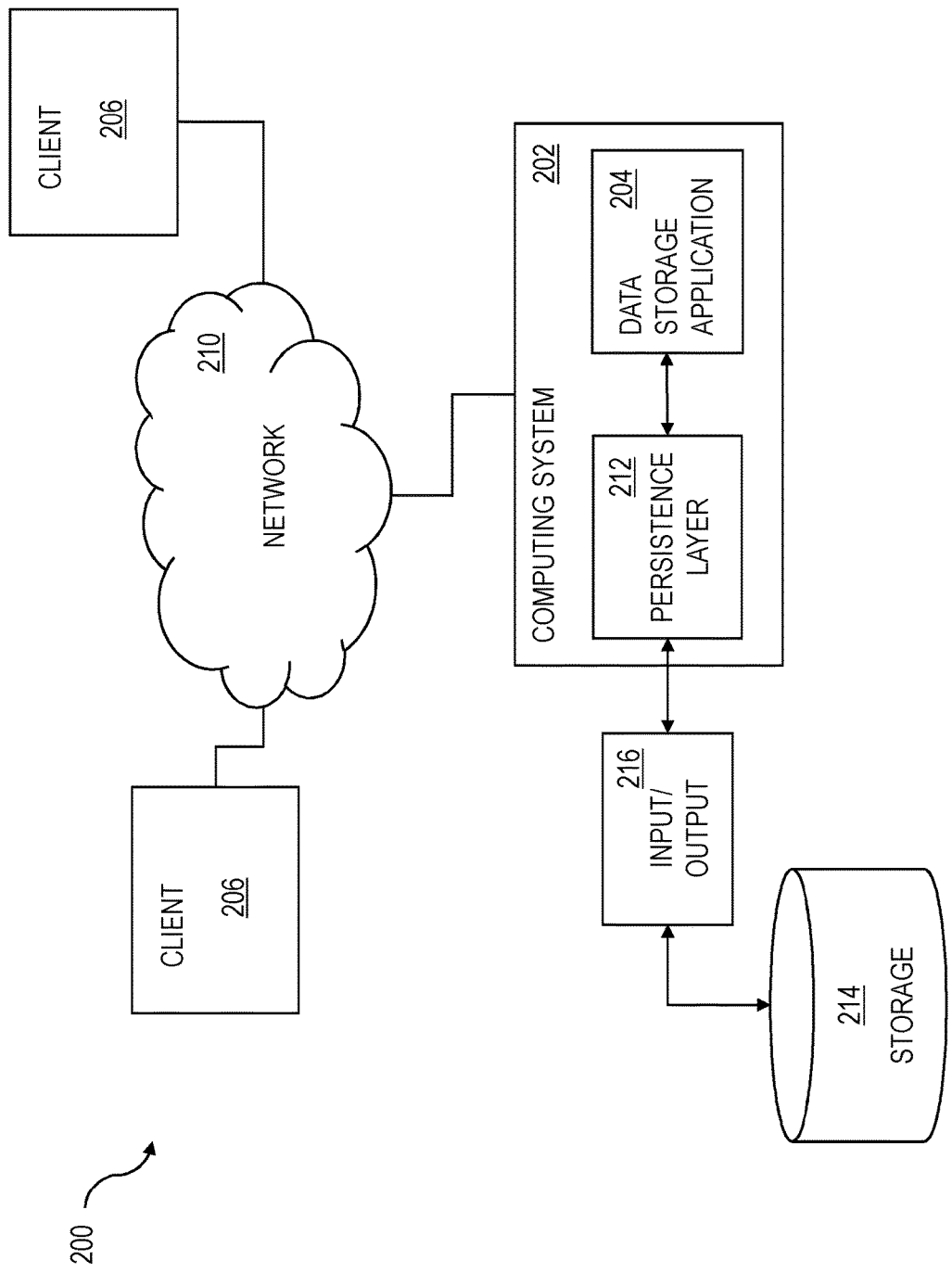
FIG. 2 shows a diagram illustrating aspects of a computing system arrangement having one or more features consistent with implementations of the current subject matter.

In some use cases, it can be desirable to control data durability at the application level. Some data may need immediate durability (similar to traditional databases), other data can be treated with delayed durability (e.g., data is flushed asynchronously), some other data may be appropriate to handle using relaxed durability (e.g., when buffers become full, they are flushed to durable storage), and still other data may not need to be durable at all.

Consistent with implementations of the current subject matter, performance and resource usage of certain applications can be significantly optimized by differentiating the applied durability mode per-request on a given data store object (in other words, rather than requiring a single, uniform durability mode for all requests to the data store object). Implementations of the current subject matter can provide an ability for an application or other software process running in association with a database distributed across multiple computing systems to differentiate between multiple durability modes for a given request.

As noted above, data stores typically use a write-ahead log (or journal) to collect incoming write requests. This is either done for the entire data store (e.g. in many currently available databases such as the HANA database architecture available from SAP SA of Walldorf, Germany) or per data store object (e.g. in some message queue implementations). Such a write-ahead log typically works entirely in one durability mode, which is globally configured per system requirements.

A write-ahead log interface typically consists of a single call to write data of one request/transaction to the log. The call returns (for synchronous processing) or calls a callback (for asynchronous processing) when the durability guarantees of the logging implementation are met.

Implementations of the current subject matter can include extending the write-ahead log interface by adding a durability mode argument (e.g. immediate, delayed, relaxed) as part of the request protocol. This durability mode argument (which can also be referred to as a durability mode parameter, command, indicator, etc.) can be set differently per request, per transaction, or the like. A typical write-ahead log implementation reacts to various events and triggers further operations. Such features can be leveraged to support flexible durability as discussed below.

FIG. 1A-1D show examples 100, 125, 150, 175 of simplified pseudo-code illustrating features of an implementation of the current subject matter. As the example pseudo-code in FIG. 1A-FIG. 1D shows, a callback passed to a log( ) function will be called when durability guarantees for a given mode are fulfilled. The pseudo-code 100 in FIG. 1A includes an additional argument for a typical logging function. In addition to designating the data to be logged and the type of callback, the log( ) function also takes a "mode" argument via which the durability mode for the logging can be specified.

For a logging request that designates an "immediate" durability mode, a callback is added to the callback list of the current buffer and the buffer is flushed immediately. In other words, the log buffer containing data is immediately written to the secondary (e.g. persistent) storage. When the input/output finishes, the system will call the respective callback. For a request that includes a "delayed" durability argument, the callback is called as soon as the data is written to the buffer, but not yet to secondary storage. However, the write to secondary storage is immediately initiated. Since the callback was already called, when the I/O finishes, no other operation occurs. Similarly, for a logging request that includes a "relaxed" durability argument, the callback is called immediately, but no input/output is triggered. In other words, the system can collect further log entries to write them together when either input/output is requested by another entry with immediate or delayed consistency requirement or when a timeout expires.

The pseudo-code 125 of FIG. 1B specifies operations to handle completion of input/output for the buffer flush, while the pseudo-code 150 of FIG. 1C addresses handling of callbacks in the buffer's callback list. The pseudo-code 175 of FIG. 1D handles flushing of the buffer on a timeout.

FIG. 2 shows an example of a computing system arrangement 200 in which a computing system 202, which can include one or more programmable processors that can be collocated, linked over one or more networks, etc., executes one or more modules, software components, or the like of a data storage application 204. The data storage application 204 can include one or more of a database, an enterprise resource program, a distributed storage system (e.g. NetApp Filer available from NetApp of Sunnyvale, Calif.), or the like. In some examples, the data storage application can support one or more multi-tenancy features, data security/encryption, cloud infrastructure features, and/or other enterprise-level capabilities.

The one or more modules, software components, or the like can be accessible to local users of the computing system 202 as well as to remote users accessing the computing system 202 from one or more client machines 206 over a network connection 210. One or more user interface screens produced by the one or more first modules can be displayed to a user, either via a local display or via a display associated with one of the client machines 206. Data units of the data storage application 204 can be transiently stored in a persistence layer 212 (e.g. a page buffer or other type of temporary persistency layer), which can write the data, in the form of storage pages, to one or more secondary (e.g. persistent) storages 214, for example via an input/output (I/O) subsystem 216. The one or more secondary storages 214 can include one or more physical storage media or devices (e.g. hard disk drives, persistent flash memory, random access memory, optical media, magnetic media, and the like) configured for writing data for longer term storage. It should be noted that the secondary storage 214 and the input/output subsystem 216 can be included in the computing system 202 despite their being shown as external to the computing system 202 in FIG. 2.

Data retained at a secondary storage 214 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 3:
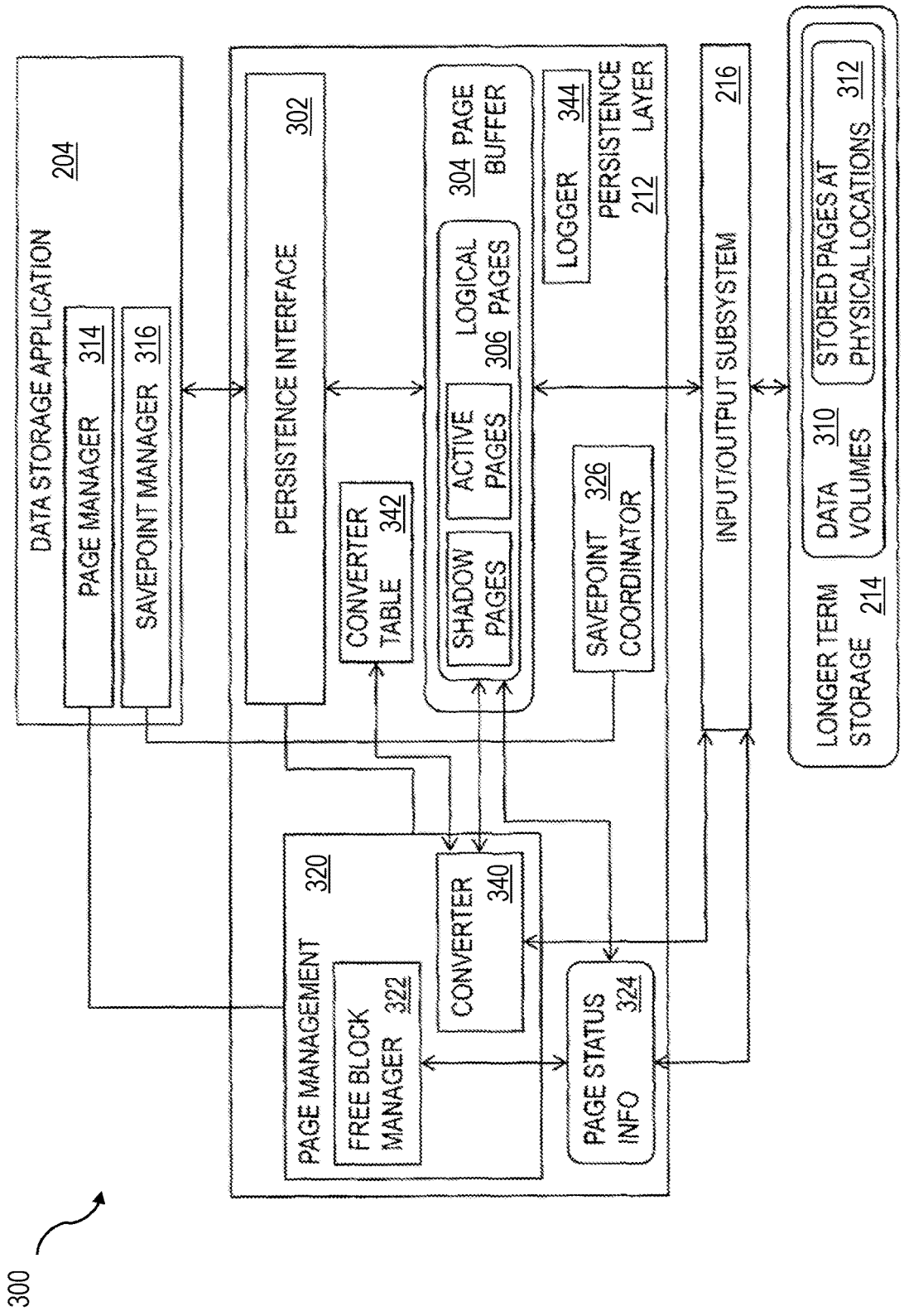
FIG. 3 shows a diagram illustrating aspects of a computing architecture having one or more features consistent with implementations of the current subject matter.

FIG. 3 shows a diagram illustrating features of a software architecture 300 with which one or more features of the current subject matter can be implemented. A data storage application 204, which can be implemented in one or more of hardware and software, can include one or more of a database application, a network-attached storage system, or the like. According to at least some implementations of the current subject matter, such a data storage application 204 can include or otherwise interface with a persistence layer 212 or other type of memory buffer, for example via a persistence interface 302. A page buffer 304 within the persistence layer 212 can store one or more logical pages 306, and optionally can include shadow pages, active pages, and the like. The logical pages 306 retained in the persistence layer 212 can be written to a secondary storage (e.g. a longer term storage, etc.) 214 via an input/output subsystem 216, which can be a software module, a sub-system implemented in one or more of software and hardware, or the like. The secondary storage 214 can include one or more data volumes 310 where stored pages 312 are allocated at physical memory blocks.

In some implementations, the data storage application 204 can include or be otherwise in communication with a page manager 314 and/or a savepoint manager 316. The page manager 314 can communicate with a page management module 320 at the persistence layer 212 that can include a free block manager 322 that monitors page status information 324, for example the status of physical pages within the secondary storage 214 and logical pages in the persistence layer 212 (and optionally in the page buffer 304). The savepoint manager 316 can communicate with a savepoint coordinator 326 at the persistence layer 204 to handle savepoints, which are used to create a consistent persistent state of the database for restart after a possible crash.

In some implementations of a data storage application 204, the page management module of the persistence layer 212 can implement shadow paging. The free block manager 322 within the page management module 320 can maintain the status of physical pages. The page buffer 304 can include a fixed page status buffer that operates as discussed herein. A converter component 340, which can be part of or in communication with the page management module 320, can be responsible for mapping between logical and physical pages written to the storage 214. The converter 340 can maintain the current mapping of logical pages to the corresponding physical pages in a converter table 342. The converter 340 can maintain a current mapping of logical pages 306 to the corresponding physical pages in one or more converter tables 342. When a logical page 306 is read from storage 214, the storage page to be loaded can be looked up from the one or more converter tables 342 using the converter 340. When a logical page is written to storage 214 the first time after a savepoint, a new free physical page is assigned to the logical page. The free block manager 322 marks the new physical page as "used" and the new mapping is stored in the one or more converter tables 342.

The persistence layer 212 can ensure that changes made in the data storage application 204 are durable according to the designated durability option for a given log write request and that the data storage application 204 can be restored to a most recent committed state after a restart. Writing data to the secondary storage 214 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 stores the changes made to the data of the data storage application 204 in a linear log. The logger component 344 can be used during recovery to replay operations since a last savepoint to ensure that all operations are applied to the data and that transactions with a logged "commit" record are committed before rolling back still-open transactions at the end of a recovery process.

With some data storage applications, writing data to a disk (e.g. to secondary or persistent storage) is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 344 whenever a change is made. This information can be written to disk when the transaction ends. The log entries can be persisted in separate log volumes while normal data is written to data volumes. With a redo log, committed changes can be restored even if the corresponding data pages were not written to disk. For undoing uncommitted changes, the persistence layer 112 can use a combination of undo log entries (from one or more logs) and shadow paging.

The persistence interface 302 can handle read and write requests of stores (e.g., in-memory stores, etc.). The persistence interface 302 can also provide write methods for writing data both with logging and without logging. If the logged write operations are used, the persistence interface 302 invokes the logger 344. In addition, the logger 344 provides an interface that allows stores (e.g., in-memory stores, etc.) to directly add log entries into a log queue. The logger interface also provides methods to request that log entries in the in-memory log queue are flushed to disk.

Log entries can contain a log sequence number, the type of the log entry and (optionally) the identifier of the transaction. Depending on the operation type, additional information can be logged by the logger 344. For an entry of type "update," for example, this would be the identification of the affected record and the after image of the modified data.

When the data application 204 is restarted, the log entries need to be processed. To speed up this process, the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 344 is invoked for writing log entries, it does not immediately write to disk. Instead it can put the log entries into a log queue in memory. The entries in the log queue can be written to disk when the corresponding transaction is finished (committed or aborted) for an "immediate" durability mode. To guarantee that the committed changes are not lost, the commit operation is not successfully finished before the corresponding log entries are flushed to disk. Writing log queue entries to disk can also be triggered by other events, for example when log queue pages are full or when a savepoint is performed. Consistent with implementations of the current subject matter, and as described above, a delayed durability mode can include starting the commit process, but not waiting for completion of the commit process. A relaxed durability mode can include proceeding without waiting even for confirmation that the commit process has begun.

With the current subject matter, the logger 344 can write a database log (or simply referred to herein as a "log") sequentially into a memory buffer in natural order (e.g., sequential order, etc.). If several physical hard disks/storage devices are used to store log data, several log partitions can be defined. Further details regarding a logger 344 utilizing log partitions can be found in co-owned U.S. Pat. No. 9,092,475, the contents of which are hereby fully incorporated by reference. In another implementation, for an immediate durability mode, the logger 344 can ensure I/O completion callback ordering in a multiple-partition log such that, even if a commit log record is written to a different partition, the confirmation of the commit is sent to the application only after all data of the transaction has been persisted by the logger 344 to the log in all log partitions affected.

An actual implementation can be optimized further to allow an implicit group commit, such as is described in co-owned U.S. Pat. No. 9,183,245, the contents of which are incorporated herein by reference. For example, after a commit log record is written, the in-memory buffer need not be immediately closed and sent to the I/O subsystem 216. In this manner, many small transactions need not generate a same number of I/O requests, which may overload the I/O subsystem 216 at no benefit. Instead, parallel I/Os can be active for each log partition (physical log disk or filer) at the same time.

Figure 4:
FIG. 4 shows a process flow diagram illustrating aspects of a method having one or more features consistent with implementations of the current subject matter.

FIG. 4 shows a process flow chart 400 illustrating features that can be included in a method consistent with implementations of the current subject matter. At 410, a request is received to perform a logging operation of a data storage application. The logging operation includes writing of data to a secondary storage. The request includes an indication of a durability mode to use for the logging operation. At 420, the logging operation is initiated according to the indication of the durability mode, and at 430, a callback is called, also according to the indication of the durability mode. The callback indicates log write completion according to the indication of the durability mode, where a log write completion indicates that a current log buffer containing data to was completely written to the secondary storage.

Implementations of the current subject matter can provide one or more advantages, which can include but are not limited to allowing flexible durability options per request and/or per transaction to optimize certain types of workloads (both in terms of perceived end-user performance and also in terms of resource consumption on the server).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on,"

above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving a request in a plurality of requests to perform a logging operation of a data storage application, the logging operation comprising writing of data to a secondary storage, the request comprising an indication of a durability mode to use for the logging operation and specifying a timing parameter of a callback call in accordance with the indication of the durability mode, the timing parameter of each callback call is specified for each received request and each data store object identified in each received request, the data storage application, upon detecting the timing parameter associated with the durability mode, executes each callback call in a list of callback calls of a current log buffer, wherein the current log buffer is flushed in accordance with the indication of the durability mode;
   initiating, for each received request, the logging operation according to the indication of the durability mode; and
   calling the callback indicating log write completion according to the indication of the durability mode, the log write completion indicating that the current log buffer containing data was completely written to the secondary storage.

2. The computer-implemented method as in claim 1, wherein the initiating comprises immediately writing the current log buffer containing data to the secondary storage and adding the callback to a callback list of a current log buffer such that the callback is called as soon as the writing is completed when the indication is for an immediate durability mode.

3. The computer-implemented method as in claim 1, wherein the initiating comprises immediately writing the current log buffer containing data to the secondary storage when the indication is for a delayed durability mode, and immediately calling the callback as soon as data are written to a buffer but not yet to the secondary storage.

4. The computer-implemented method as in claim 1, wherein the initiating comprises not immediately writing the log buffer containing data to the secondary storage, and calling the callback immediately when the indication is for a relaxed durability mode.

5. The computer-implemented method as in claim 1, further comprising writing the current log buffer at the latest when the current log buffer becomes full or when a timeout occurs.

6. The computer-implemented method as in claim 1, wherein the request further comprises an indication of the data to be logged and a type of the callback.

7. A system comprising:
   at least one programmable processor; and
   a non-transitory machine-readable medium storing instructions that, when executed by the at least one programmable processor, cause the at least one programmable processor to perform at least operations comprising:
      receiving a request in a plurality of requests to perform a logging operation of a data storage application, the logging operation comprising writing of data to a secondary storage, the request comprising an indication of a durability mode to use for the logging operation and specifying a timing parameter of a callback call in accordance with the indication of the durability mode, the timing parameter of each callback call is specified for each received request and each data store object identified in each received request, the data storage application, upon detecting the timing parameter associated with the durability mode, executes each callback call in a list of callback calls of a current log buffer, wherein the current log buffer is flushed in accordance with the indication of the durability mode;
      initiating, for each received request, the logging operation according to the indication of the durability mode; and
      calling the callback indicating log write completion according to the indication of the durability mode, the log write completion indicating that the current log buffer containing data was completely written to the secondary storage.

8. The system as in claim 7, wherein the initiating comprises immediately writing the current log buffer containing data to the secondary storage and adding the callback to a callback list of a current log buffer such that the callback is called as soon as the writing is completed when the indication is for an immediate durability mode.

9. The system as in claim 7, wherein the initiating comprises immediately writing the current log buffer containing data to the secondary storage when the indication is for a delayed durability mode, and immediately calling the callback as soon as data are written to a buffer but not yet to the secondary storage.

10. The system as in claim 7, wherein the initiating comprises not immediately writing the log buffer containing data to the secondary storage, and calling the callback immediately when the indication is for a relaxed durability mode.

11. The system as in claim 7, wherein the operations further comprise writing the current log buffer at the latest when the current log buffer becomes full or when a timeout occurs.

12. The system as in claim 7, wherein the request further comprises an indication of the data to be logged and a type of the callback.

13. A computer program product comprising a non-transitory machine-readable medium storing instructions that, when executed by at least one programmable processor, cause the at least one programmable processor to perform operations comprising:

receiving a request in a plurality of requests to perform a logging operation of a data storage application, the logging operation comprising writing of data to a secondary storage, the request comprising an indication of a durability mode to use for the logging operation and specifying a timing parameter of a callback call in accordance with the indication of the durability mode, the timing parameter of each callback call is specified for each received request and each data store object identified in each received request, the data storage application, upon detecting the timing parameter associated with the durability mode, executes each callback call in a list of callback calls of a current log buffer, wherein the current log buffer is flushed in accordance with the indication of the durability mode;

initiating, for each received request, the logging operation according to the indication of the durability mode; and calling the callback indicating log write completion according to the indication of the durability mode, the log write completion indicating that the current log buffer containing data was completely written to the secondary storage.

14. The computer program product as in claim 13, wherein the initiating comprises immediately writing the current log buffer containing data to the secondary storage and adding the callback to a callback list of a current log buffer such that the callback is called as soon as the writing is completed when the indication is for an immediate durability mode.

15. The computer program product as in claim 13, wherein the initiating comprises immediately writing the current log buffer containing data to the secondary storage when the indication is for a delayed durability mode, and immediately calling the callback as soon as data are written to a buffer but not yet to the secondary storage.

16. The computer program product as in claim 13, wherein the initiating comprises not immediately writing the log buffer containing data to the secondary storage, and calling the callback immediately when the indication is for a relaxed durability mode.

17. The computer program product as in claim 13, wherein the operations further comprise writing the current log buffer at the latest when the current log buffer becomes full or when a timeout occurs.

18. The computer program product as in claim 13, wherein the request further comprises an indication of the data to be logged and a type of the callback.

* * * * *